United States Patent [19]  [11] 3,920,741
Ribaldone et al.  [45] Nov. 18, 1975

[54] N-ETHYL-N-(2-BUTENE-4-CHLORO)-AMINO-BENZENES AND PROCESSES FOR PRODUCING SAME

[75] Inventors: Giuseppe Ribaldone, Gallarate; Giampiero Borsotti, Novara, both of Italy

[73] Assignee: Montecatini Edison S.p.A., Milan, Italy

[22] Filed: Nov. 3, 1972

[21] Appl. No.: 303,541

[30] Foreign Application Priority Data
Nov. 8, 1971  Italy .................................. 30812/71

[52] U.S. Cl. .............. 260/577; 260/205; 260/465 E
[51] Int. Cl.² .................. C07C 87/60; C07C 121/70
[58] Field of Search ..................................... 260/577

[56] References Cited
UNITED STATES PATENTS
2,921,094  1/1960  Shapiro et al. ...................... 260/577

OTHER PUBLICATIONS
Tweedie et al, "J. Org. Chem.," vol. 26, pp. 3,676–3,681, (1961).
Babayan et al, "Chem. Abstracts," vol. 52, p. 3707d, (1958).
Millar et al, "Sidgwick's Org. Chem. of Nitrogen," 3rd ed., p. 102 (1966).
Weissberger, "Technique of Org. Chem.," vol. III, part I, "Separation and Purification," pp. 552–554 (1956).

*Primary Examiner*—Lewis Gotts
*Assistant Examiner*—S. P. Williams
*Attorney, Agent, or Firm*—Hubbell, Cohen, and Stiefel

[57]  ABSTRACT
An N-ethyl-N-(2-butene-4-chloro)-amino-benzene is prepared by reacting an N-ethylaminobenzene with trans-1,4-dichloro-2-butene which may then be subjected to cyanuration to form an N-ethyl-N-(2-butene-4-cyano)-amino-benzene which is useful in preparing disperse type azoic dyestuffs.

6 Claims, No Drawings

N-ETHYL-N-(2-BUTENE-4-CHLORO)-AMINO-BENZENES AND PROCESSES FOR PRODUCING SAME

BACKGROUND OF THE INVENTION

1. Field of the Invention

The invention relates to compounds having the formula:

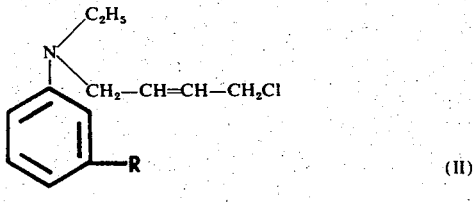
(II)

wherein R is hydrogen or methyl, and processes for their preparation.

2. Description of the Prior Art

Substitution reactions are, of course, known. However, it is generally recognized that a substitution reaction involving an excess of a compound having two identical functional groups generally leads to considerable amounts of the di-substituted product and comparatively low yields of the mono-substituted product.

In particular, with respect to the behavior of a compound such as trans-1,4-dichloro-2-butene in a substitution reaction, the literature suggests the formation of di-substitution products and, with respect to the cis-isomer, the formation of cyclic products, in view of the high reactivity of the two chlorine atoms contained in these compounds.

SUMMARY OF THE INVENTION

The invention provides processes for preparing novel compounds having the formula:

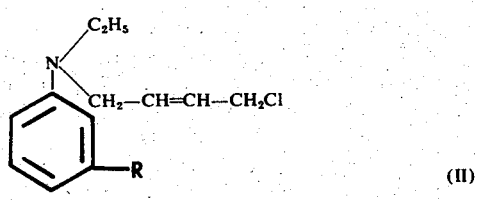
(II)

wherein R is hydrogen or methyl.

More particularly, the invention relates to the preparation of N-ethyl-N-(2-butene-4-chloro)-aniline and N-ethyl-N-(2-butene-4-chloro)-m-toluidine (hereinafter generically referred to as N-ethyl-N-(2-butene-4-chloro)-amino-benzenes) by reacting either N-ethyl-aniline or N-ethyl-m-toluidine (hereinafter generically referred to as N-ethylaminobenzenes) with trans-1,4-dichloro-2-butene to form the novel compounds of the formula:

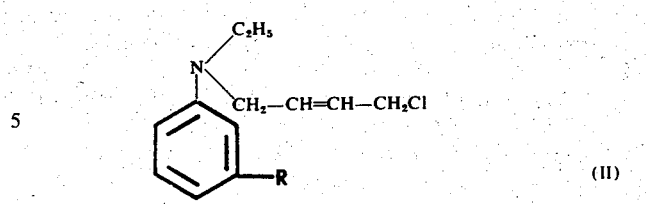
(II)

wherein R is hydrogen or methyl.

These compounds of formula II, N-ethyl-N-(2-butene-4-chloro)-aniline and N-ethyl-N-(2-butene-4-chloro)-m-toluidine (hereinafter generically referred to as N-ethyl-N-(2-butene-4-chloro)-amino-benzenes) are subsequently subjected to a cyanuration reaction according to conventional techniques to convert them to the corresponding 4-cyano compounds of the following formula I:

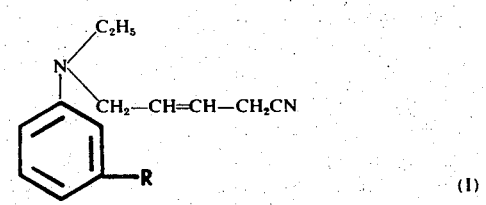
(I)

The N-ethyl-N-(2-butene-4-cyano)-amino-benzenes of the formula (I), obtained by cyanurating the compounds of the invention are useful as intermediates in the preparation of dyestuffs of the dispersed azoic type for water-repellent fibers such as 2-chloro-4-nitro-6bromophenyl-azo-2'-methyl-4'-(N-ethyl-N-ω-cyano-butene-2-yl)amino-phenyl which dyes polyester fibers in a brown shade, or 6-methylsulphonyl-benzothiazol-2-yl-azo-2' methyl-4'-(N-ethyl-N-ω-cyano-butene-2-yl)-amino-phenyl which dyes polyester fibers in bright ruby red shades, and of the water-soluble mono-azoic-cationic type, such as for instance

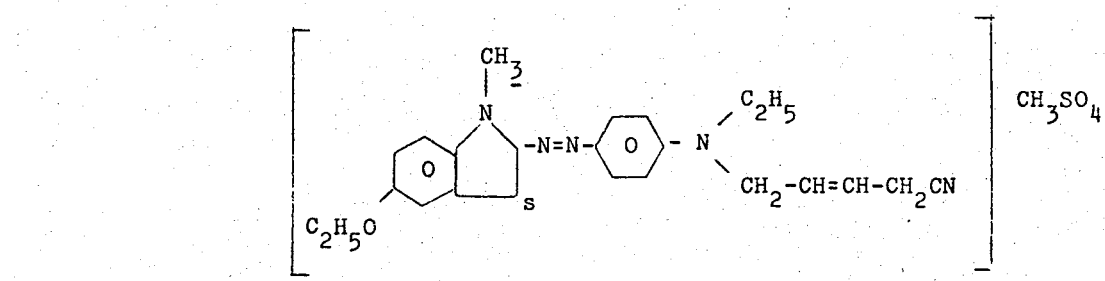

which dyes polyacrylonitrile fibers in a pure blue hue. These dyes can be easily prepared by coupling, according to the known art, the compounds of the invention with a mono-azo compound of the series of substituted phenyl or substituted hetero-cyclyl.

As pointed out above, substitution reactions involving a compound having two identical functional groups would ordinarily be expected to lead to the formation of di-substituted products. Therefore, one skilled in the art would not expect that in a reaction, in which substitution occurs between an N-ethylamino-benzene and trans-1,4-dichloro-2-butene, there is the possibility of replacing only one of the chlorine atoms of the trans-1,4-dichloro-2-butene whereby high yields of the mono-substitution product, namely, an N-ethyl-N-(2-butene-4-chloro)-amino-benzene are obtained.

When the process according to the invention is practiced industrially, "technical" 1,4-dichloro-2-butene, usually consisting of a mixture of 95 – 98 percent of trans-isomer and of 2 – 5 percent of cis-isomer is generally used.

Consequently, when an N-ethylaminobenzene and "technical" 1,4-dichloro-2-butene are reacted during the process of this invention, there are produced, in addition to the desired mono-substitution product of the formula II, minor amounts of the di-substitution product of the formula:

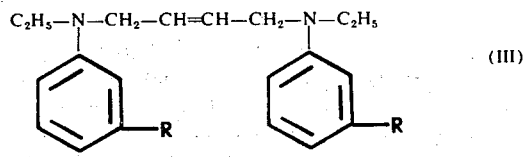

(III)

wherein R is hydrogen or methyl; and a further impurity of a cyclic nature, which is derived from the cis-isomer and which is detectable, for example, by chromatographic analysis on a thin silica gel layer.

According to a further aspect of the invention, there is provided an unexpectedly simple and effective way of separating the desired mono-substitution product of the formula II from the reaction by-products (di-substitution products [of formula III], cyclic impurities) and from the unreacted starting materials.

wherein R is hydrogen or methyl. The process comprises reacting an N-ethylaminobenzene selected from the group consisting of N-ethyl-aniline and N-ethyl-m-toluidine with trans-1,4-dichloro-2-butene, the molar ratio of trans-1,4-dichloro-2-butene to the N-ethylaminobenzene being at least 5, at a temperature ranging from about 20°C to 120°C, at atmospheric pressure, in the presence of at least one equivalent of a neutralizing agent per mole of N-ethylaminobenzene. The resulting reaction mass is then subjected to a first extraction with 0.5 N HCl, which is selective for the removal of unreacted N-ethylaminobenzene and the undesired disubstitution product, and the residue, i.e., the organic phase remaining after the first extraction, is subjected to a second extraction with 2 N HCl, which is selective for the N-ethyl-N-(2-butene-4-chloro)-amino-benzene formed by the reaction. The 2 N hydrochloric acid solution, is neutralized, and from the solution, the N-ethyl-N-(2-butene-4-chloro)-aniline, or N-ethyl-N-(2-butene-4-chloro)-m-toluidine is isolated according to known techniques. The thus obtained compound may then be transformed by known cyanuration techniques into N-ethyl-N-(2-butene-4-cyano)-aniline, or N-ethyl-N-(2-butene-4-cyano)-m-toluidine.

The process is schematically shown by the following equations:

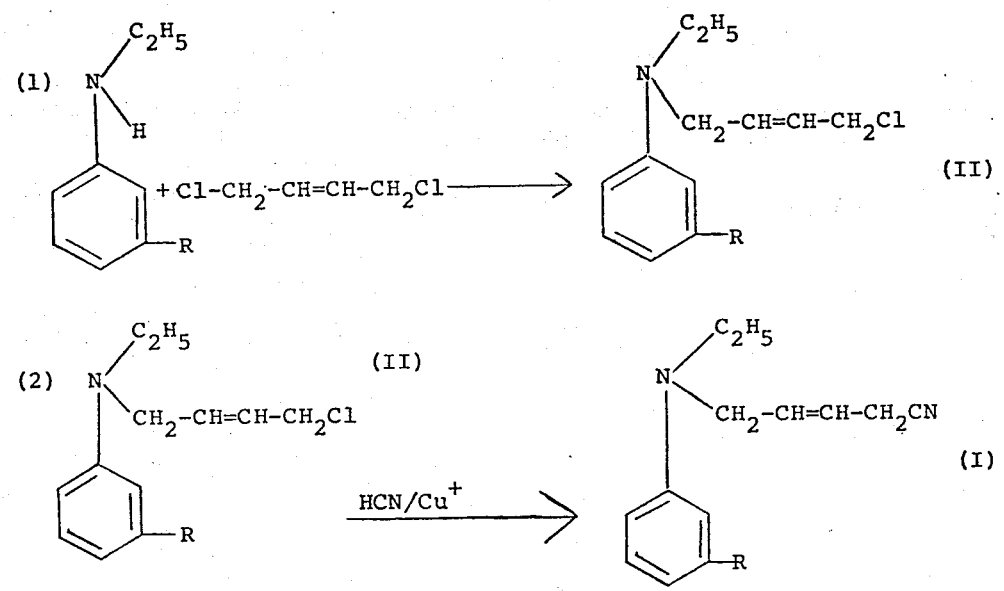

Finally, the invention is also directed to the novel compounds of the formulae (I) and (II). Thus, an object of this invention is to provide a simple and economical process for preparing compounds such as N-ethyl-N-(2-butene-4-cyano)-aniline and N-ethyl-N-(2-butene-4-cyano)-m-toluidine, and the corresponding chlorine containing precursors thereof in high yields.

DETAILED DESCRIPTION

In greater detail, the present invention contemplates a process for preparing a compound of the formula:

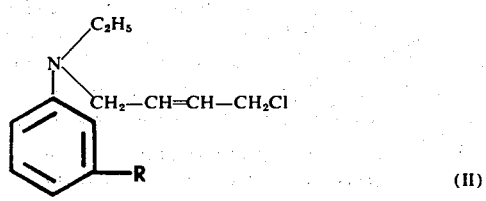

(II)

wherein R is as defined above.

During reaction (1), the temperature is maintained between about 20°C and 120°C, preferably at about 80°C. The pressure is atmospheric pressure. The molar ratio of trans-1,4-dichloro-2-butene to the N-ethylaminobenzene is at least equal to 5; particularly favorable results are obtained with a molar ratio of about 10. Higher molar ratios are possible, although they are not recommended from an economic viewpoint because of the large amounts of reactants to be treated, and because of the larger amounts which then have to be recycled.

Reaction (1) is carried out in the presence of a neutralizing agent because of the hydrochloric acid which develops during the reaction.

Suitable neutralizing agents include anhydrous sodium carbonate, potassium carbonate, magnesium oxide and calcium oxide, in quantities of at least one equivalent per mole of the N-ethylaminobenzene. Moreover, the N-ethylaminobenzene itself can be employed as the neutralizing agent. In such a case, the N-ethylaminobenzene will be used in an amount of at least twice the stoichiometric amount required for reaction (1). Anhydrous sodium carbonate is the preferred neutralizing agent.

The use of solvents in reaction (1) is not required, although reaction (1) can be conducted in the presence of inert water-immiscible solvents, such as petroleum ether, toluene, xylene, chlorobenzene, etc. If a solvent is used, petroleum ether is the preferred solvent.

At the conclusion of reaction (1) the reaction mixture is freed, for example, by filtration, from the salts which have formed, and is then subjected, according to the present invention, to a series of successive extractions carried out with HCl at different concentrations, each of which is selective for a different component of the reaction mixture. The extractions are conducted as follows:

a  a first extraction is carried out with 0.5 N HCl, which is selective for the unreacted N-ethylaminobenzene and for the di-substitution product;
b  the residual solution remaining after the first extraction is subjected to a second extraction with 2 N HCl, which is selective for the mono-substitution product, namely, the intermediate N-ethyl-N-(2-butene-4-chloro)-amino-benzene (II); and
c  the residual solution remaining after the second extraction is subjected to a third extraction with at least 5 N HCl, which separates the cyclic impurities.

The final residue remaining after the third extraction consists, therefore, of a mixture of isomeric 1,4-dichloro-2-butenes and the solvent, if any, which can be recovered separately.

The hydrochloric acid solution obtained in step (b), containing the mono-substitution product of the formula(II) is, of course, the important fraction. This solution, which may be optionally diluted with water, is decolorized with activated carbon and then filtered. The filtrate is neutralized and the N-ethyl-N-(2-butene-4-chloro)-amino-benzene (formula II) is recovered using well known techniques, such as decantation, centrifugation, extraction with a solvent, etc.

The method, according to the invention, of separating the mixture of products obtained from reaction (1) is quite rapid and unexpectedly easy to perform. To realize the ease and simplicity of the method, it is sufficient to consider that, if an alternative method were used to separate the reaction mixture components, the separation would be quite difficult to effect. For example, if only one extraction with HCl, for example 2 N HCl, is performed, and the thereby obtained hydrochloric acid solution is treated as described above, a mixture of the mono-substitution product, the di-substitution product and the unreacted N-ethyl-aminobenzene, would be obtained. Such a mixture of components is extremely difficult to separate. Thus, the present method, which utilizes a series of HCl extractions provides unexpectedly advantageous results.

The cyanuration reaction (2), by which the compounds of formula (II) are converted to those of formula (I), can be effected according to any of the known techniques; for instance by means of liquid hydrocyanic acid or alkaline cyanides and acids, in the presence of catalytic amounts of cuprous salts (CuCl, CuCN, etc.).

Cyanuration can be conducted, for example, by reacting an aqueous solution of HCN, in the presence of a catalytic amount of CuCl, with the intermediate compound of the formula (II) at a temperature ranging from about 40°C to 77°C. After cooling, the complex, which has formed from the reaction between the cuprous salt and the intermediate product is filtered out and it can be recycled, as such, as a substitute for the cuprous salt. The reaction product is neutralized and extracted with a solvent, for example, ethyl ether, to separate the desired N-ethyl-N-(2-butene-4-cyano)-aminobenzene (formula I) therefrom. The cyanuration reaction can also be conducted by employing NaCN and HCl.

The novel compounds: N-ethyl-N-(2-butene-4-chloro)-aniline; N-ethyl-N-(2-butene-4-chloro)-m-toluidine; N-ethyl-N-(2-butene-4-cyano)-aniline; and N-ethyl-N-(2-butene-4-cyano)-m-toluidine are within the scope of the present invention.

DESCRIPTION OF THE PREFERRED EMBODIMENTS

The following examples are given to better illustrate the present invention, without the invention, however, being limited thereto.

EXAMPLE 1

700 g (5.6 moles) of 1,4-dichloro-2-butene (consisting of 98 percent of trans-isomer and 2 percent of cis-isomer) and 120 g (1.13 moles) of powdered anhydrous sodium carbonate were introduced into a flask provided with reflux cooler, stirrer, feeding-funnel, thermometer and an external water heating system.

The temperature of the mixture was brought to 80°C and subsequently 75 g (0.55 mole) of N-ethyl-m-toluidine were gradually added over a period of about 4 hours.

The reaction mixture was stirred at 80°C for about 5 hours, after which it was cooled to room temperature. The cooled reaction mixture was then filtered and the solid precipitated salts were washed with petroleum ether.

The petroleum ether washing liquid was then combined with the filtrate. The combined petroleum ether and filtrate solution was then extracted with two 125 ml portions of 0.5 N HCl and subsequently, with water. The hydrochloric acid solution, after being combined with the washing water, contains the unreacted N-ethyl-m-toluidine and the di-substitution product which can be recovered therefrom separately, if so desired.

The organic phase, i.e., the petroleum ether solution was then extracted with 2 N HCl (once with 200 ml and 4 times with 100 ml) and then washed again with water.

The aqueous phase, i.e., the hydrochloric acid extract, to which the wash water was added, contained only the N-ethyl-N-(2-butene-4-chloro)-m-toluidine.

The organic phase was subjected to a further extraction with 5 N HCl (2 times with 50 ml). The aqueous acidic extract contained the cyclic impurity.

The unreacted 1,4-dichloro-2-butene was recovered from the residue after the petroleum ether had been removed from the organic phase by distillation.

The 2 N hydrochloric acid solution, admixed with the wash water, was diluted with water, decolorized with activated carbon, and filtered. The filtrate was neutralized with anhydrous powdered sodium carbonate. The neutralized filtrate was then extracted with petroleum ether. Activated carbon was added to the petroleum ether extract to decolorize same, and anhydrous sodium carbonate was added thereto to neutralize the extract which was then filtered. The petroleum ether filtrate was then evaporated to a residue.

A residue weighing 93.0 g (yield of 75 percent based on the N-ethyl N-m-toluidine) was obtained. The residue consisted of N-ethyl-N-(2-butene-4-chloro)-m-toluidine having an acidimetric titer of 99 percent.

This substance had a boiling point of 121°C/0.6 mm Hg and an index of refraction $n_D^{20} = 1.5598$.

Elemental analysis, as well as IR and NMR spectra confirmed the structure of the compound.

The cyanuration reaction by which the N-ethyl-N-(2-butene-4-chloro)-m-toluidine was converted to N-ethyl-N-(2-butene-4-cyano)-m-toluidine was effected with liquid HCN according to the following procedure:

60 cc of water, 2.4 g of CuCl and 24 cc of liquid HCN were introduced, at room temperature, into a flask provided with a reflux condenser, stirrer, feeding-funnel, thermometer and an external water heating system.

60 g (0.268 mole) of N-ethyl-N-(2-butene-4-chloro)-m-toluidine were introduced into the flask over a period of about 2 hours.

At the beginning of the addition the temperature of the reacting mixture was kept at about 40°C and thereafter, it was gradually raised until it reached 65°C at the end of the addition.

Heating was continued for about 4 more hours, under stirring, with the temperature being maintained at about 75°C – 77°C.

The mixture was cooled to room temperature and diluted with water to form a precipitate. The precipitate, amounting to 5.4 g of a cuprous complex with the mono-substitution product, was filtered off.

The filtrate was neutralized with anhydrous sodium carbonate and extracted with ethyl ether. The ethereal extract was treated with activated carbon, and anhydrous sodium carbonate and was then filtered.

After evaporation of the ethereal filtrate, 53 g (yield equal to 92 percent) of N-ethyl-N-(2-butene-4-cyano)-m-toluidine having an acidimetric titer equivalent to 99.6 percent and a boiling point of 140°C/0.3 mm Hg were obtained.

Elemental analysis and IR and NMR spectra confirmed the structure of the compound.

Alternatively, the cyanuration reaction may be conducted with NaCN and HCl according to the following procedure:

Into the same apparatus described above, 120 cc of water, 30.6 g of 97 percent NaCN and 2.4 g of CuCl were introduced.

After cooling the mixture down to 0°C, 63.6 g of 36 percent HCl were gradually introduced. When the addition was nearly completed, a white CuCN precipitate formed.

Thereafter, over a period of about 4 hours, 60 g (0.268 mole) of N-ethyl-N-(2-butene-4-chloro)-m-toluidine were gradually added. At the beginning of the addition the temperature was kept at about 50°C, but it was gradually raised to 60°C, until reaching about 75°C at the end of the addition. The reaction mixture was stirred for about 4 more hours at 75°C–77°C.

By proceeding as described above, 52.9 g (yield of 91.8 percent) of N-ethyl-N-(2-butene-4-cyano)-m-toluidine were finally obtained. This compound can be used to prepare dyeing agents. Thus by operating in this way:

25.2 parts of 2-chloro-4-nitro-6-bromo-aniline were poured, under stirring and over a period of about 30 minutes, into 40 parts by volume of 96 percent $H_2SO_4$.

The temperature of the mixture then rose spontaneously from room temperature (ca. 20°C) to 35°-40°C. After about 15 minutes of stirring, complete dissolution was achieved. The thus obtained solution was then dripped, over about 15 minutes, into another solution consisting of 43 parts by volume of nitrosylsulfuric acid (containing 2.6 moles/liter), and the mixture was then brought to a temperature of 10°C.

The mixture was then stirred for about 2 hours at a temperature of from 10°–15°C, filtered under vacuum and the excess nitrous acid was eliminated by the addition of 5 parts by volume of a 10 percent solution of sulfamic acid.

The solution thus prepared was then slowly poured into a solution consisting of:

250 parts of water
12.5 parts (vol.) of concentrated HCl
23.6 parts of N-ethyl-N-(4-cyano-butene-2-yl)-m-toluidine
150 parts (vol.) of ethyl alcohol
100 parts of ice.

The temperature of the reaction mixture was maintained at between 0° and 2°C, by means of a water-and-ice bath, whereby there was obtained a reddish pitchy precipitate to which sodium acetate crystals were added until a pH of about 2.5 was reached.

This mixture was then decanted and the semi-solid precipitate was dissolved in 100 parts (vol.) of glacial acetic acid. The mixture was then slowly diluted with water, under constant stirring. The mixture was then filtered, washed to neutrality and dried at 80°C. Thereby was obtained a powder having the following structure:

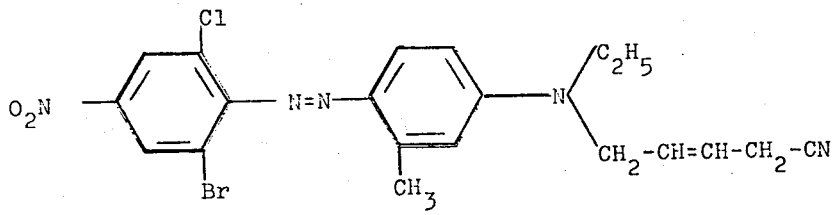

which is suited for dyeing polyester fibers in a brown shade with generally very good fastness characteristics.

EXAMPLE 2

1,250 g (10 moles) of 1,4-dichloro-2-butene (consisting of 98 percent of trans-isomer and 2 percent of cis-isomer) and 212 g (2.0 moles) of anhydrous sodium carbonate were introduced into a flask, which was equipped as described in Example 1. The temperature of the mixture was brought to 80°C and 121 g (1 mole)

of N-ethyl-aniline were gradually added over a period of about 4 hours.

The reaction mixture was stirred at 80°C for about 5 hours, after which it was cooled to room temperature. The cooled reaction mixture was then filtered and the solid precipitated salts were washed with petroleum ether.

The petroleum ether washing liquid was then combined with the filtrate. The combined petroleum ether and filtrate solution was then extracted with 0.5 N HCl (3 times with 100 ml and once with 50 ml) and subsequently, with water. The hydrochloric acid solution contains the unreacted N-ethyl-aniline and the disubstitution product.

The organic phase, i.e., the petroleum ether solution was then extracted with five 200 ml portions of 2 N HCl and then washed again with water.

The aqueous phase, i.e., the hydrochloric acid extract to which the wash water was added, contained only the N-ethyl-N-(2-butene-4-chloro)-aniline.

The organic phase was subjected to a further extraction with 5 N HCl (3 times with 50 ml). The aqueous acidic extract contained the cyclic impurity. The unreacted 1,4-dichloro-2-butene was recovered from the residue after the petroleum ether had been removed from the organic phase by distillation.

The 2 N hydrochloric acid solution, admixed with the wash water, was diluted with water, decolorized with activated carbon, and filtered. The filtrate was neutralized with powdered anhydrous sodium carbonate. The neutralized filtrate was then extracted with petroleum ether. Activated carbon was added to the petroleum ether extract to decolorize same, and anhydrous sodium carbonate was added thereto to neutralize the extract which was then filtered.

The petroleum ether filtrate was then evaporated to obtain a residue weighing 167.0 g (yield of 80 percent based on the N-ethyl-aniline), and consisting of N-ethyl-N-(2-butene-4-chloro)-aniline, and having an acidimetric titer of 99.5 percent.

This substance had a boiling point of 101° – 102°C/0.2 mm Hg and an index of refraction $n_D^{20}$ = 1.5660.

Elemental analysis, as well as IR and NMR spectra confirmed the structure of the compound. The cyanuration reaction by which the N-ethyl-N-(2-butene-4-chloro)-aniline was converted to N-ethyl-N-(2-butene-4-cyano)-aniline was effected according to the following procedure:

60 cc of water, 2.4 g of CuCl and 24 cc of liquid HCN were introduced, at room temperature, into a flask provided with a reflux condenser, stirrer, feeding-funnel, thermometer and an external water heating system. 64 g (0.306 mole) of N-ethyl-N-(2-butene-4-chloro)-aniline were introduced into the flask over a period of about 2 hours. At the beginning of the addition, the temperature of the reacting mixture was kept at about 40°C, and thereafter, it was gradually raised until it reached about 65°C at the end of the addition. Heating was continued for about 4 more hours, under stirring, with the temperature being maintained between about 75°C and 77°C.

The mixture was cooled to room temperature and diluted with water to form a precipitate. The precipitate, amounting to 5.4 g of a cuprous complex with the mono-substitution product was filtered off.

The filtrate was neutralized with anhydrous powdered sodium carbonate and extracted with ethyl ether. The ethereal extract was then treated with activated carbon, and anhydrous sodium carbonate and was then filtered.

55.6g (yield of 91 percent) of N-ethyl-N-(2-butene-4-cyano)-aniline having an acidimetric titer equal to 99.8 percent and a boiling point of 144° – 146°C/0.5 mm Hg were obtained after evaporation of the ether.

Elemental analysis and IR and NMR spectra confirmed the structure of the compound.

Variations and modifications can, of course, be made without departing from the spirit and scope of the invention.

Having thus described our invention, what we desire to secure by letters Patent and hereby claim is:

1. A process for preparing a compound of the formula:

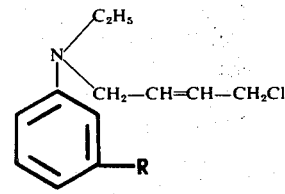

(II)

wherein R is hydrogen or methyl, said process comprising reacting an amino compound selected from the group consisting of N-ethyl-aniline and N-ethyl-m-toluidine with trans-1,4-dichloro-2-butene, the molar ratio of the trans-1,4-dichloro-2-butene to said amino compound being at least 5 to 1, at a temperature of about 20°C to 120°C at atmospheric pressure, in the presence of a neutralizing agent to form a reaction mass, subjecting the reaction mass to a first extraction with 0.5 N HCl to remove the unreacted amino compound and the di-substitution product formed in the reaction, thereafter subjecting the reaction mass to a second extraction with 2 N HCl to obtain an extract containing a chloro-amine selected from the group consisting of N-ethyl-N-(2-butene-4-chloro)-aniline and N-ethyl-N-(2-butene-4-chloro)-m-toluidine, neutralizing said extract and isolating said chloro-amine from the neutralized extract.

2. A process according to claim 1, wherein reacting is effected at about 80°C.

3. A process according to claim 1, wherein the molar ratio is about 10 to 1.

4. A process according to claim 1, wherein the neutralizing agent is anhydrous sodium carbonate, anhydrous potassium carbonate, anhydrous magnesium oxide or anhydrous calcium oxide.

5. A process according to claim 1, wherein reacting is effected in the presence of an inert water-immiscible solvent.

6. A process according to claim 5, wherein the solvent is petroleum ether, toluene, xylene or chlorobenzene.

* * * * *